No. 765,228. PATENTED JULY 19, 1904.
I. DE KAISER.
COIL RETAINING MEANS FOR ELECTRICAL MACHINES.
APPLICATION FILED NOV. 21, 1903.
NO MODEL.
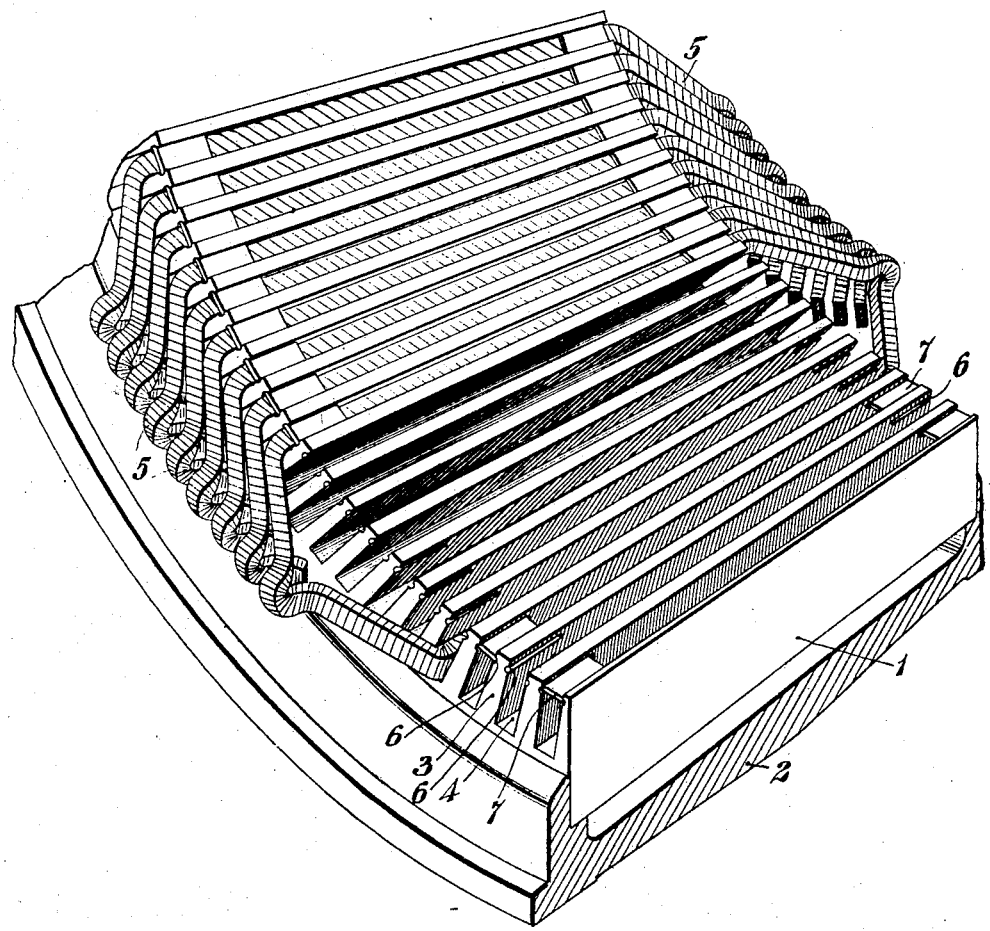
WITNESSES:
C. L. Belcher
O. S. Schairer
INVENTOR
Isaac De Kaiser
BY
Wesley G. Carr
ATTORNEY No. 765,228. Patented July 19, 1904.

UNITED STATES PATENT OFFICE.

ISAAC DE KAISER, OF WILKINSBURG, PENNSYLVANIA, ASSIGNOR TO WESTINGHOUSE ELECTRIC & MANUFACTURING COMPANY, A CORPORATION OF PENNSYLVANIA.

COIL-RETAINING MEANS FOR ELECTRICAL MACHINES.

SPECIFICATION forming part of Letters Patent No. 765,228, dated July 19, 1904.

Application filed November 21, 1903. Serial No. 182,168. (No model.)

*To all whom it may concern:*

Be it known that I, ISAAC DE KAISER, a citizen of the United States, and a resident of Wilkinsburg, in the county of Allegheny and State of Pennsylvania, have invented a new and useful Improvement in Coil-Retaining Means for Electrical Machines, of which the following is a specification.

My invention relates to the construction of electrical machines; and it has for its object to provide an improved means for securing and retaining the coils of such machines in proper position.

The single figure of the accompanying drawing is a perspective view of a section of the stator of an induction-motor constructed in accordance with my invention.

The laminated-iron core 1 is securely held in a cast frame 2 and comprises annular sheet-iron punchings having inwardly-projecting teeth 3, between which are slots 4 for the reception of coils 5. The sides of the teeth 3 adjacent to their free ends are provided with grooves 6, which extend inwardly from the ends of the core a short distance only, and the beveled edges of small fiber strips 7 are fitted tightly into these grooves after the coils are in place. If the grooves 6 extended entirely across the core, the cross-sectional area of the teeth would be materially reduced, thus causing a higher flux density at the ends of the teeth for the same winding on the core than would be produced if there were no grooves in the teeth. Such construction has been employed and has been found to be objectionable for the reason stated. By employing my invention the cross-sectional area of the ends of the teeth is not reduced except at the extreme ends of the core, and at the same time a very simple and easily-applied means is provided for retaining the coils in proper position.

It is evident that my invention may be employed in all classes of electrical apparatus where its application is possible, and consequently I do not wish it limited to the specific apparatus shown and described.

I claim as my invention—

1. In electrical apparatus, a core having teeth which form slots for the reception of coils and are provided with grooves adjacent to their free ends which extend inwardly a short distance only from the ends of the core.

2. In electrical apparatus, a core having teeth which form slots for the reception of coils and are provided with grooves in their sides and adjacent to their free ends which extend from the ends of the core only part way across it, and core-retaining strips the edges of which fit into said grooves.

3. In electrical apparatus, a core having teeth which form slots to receive coils and are provided with grooves in their sides and near their free ends but extending inwardly only short distances from the ends of the core, and coil-retaining strips the edges of which fit into the grooves in adjacent teeth.

In testimony whereof I have hereunto subscribed my name this 13th day of November, 1903.

ISAAC DE KAISER.

Witnesses:
CHAS. C. TYLER,
BIRNEY HINES.